United States Patent
Maniaci et al.

(10) Patent No.: US 9,979,199 B2
(45) Date of Patent: May 22, 2018

(54) MULTIPLE INPUT SINGLE OUTPUT HYBRID POWER SYSTEM

(71) Applicant: Windstrip LLC, St. Paul, MN (US)

(72) Inventors: Joe Maniaci, St. Paul, MN (US); Jeffrey Buchholz, San Clemente, CA (US)

(73) Assignee: Windstrip LLC, St. Paul, MN (US)

(*) Notice: Subject to any disclaimer, the term of this patent is extended or adjusted under 35 U.S.C. 154(b) by 286 days.

(21) Appl. No.: 14/435,015

(22) PCT Filed: Oct. 11, 2013

(86) PCT No.: PCT/US2013/064477
§ 371 (c)(1),
(2) Date: Apr. 10, 2015

(87) PCT Pub. No.: WO2014/059236
PCT Pub. Date: Apr. 17, 2014

(65) Prior Publication Data
US 2015/0263524 A1 Sep. 17, 2015

Related U.S. Application Data

(60) Provisional application No. 61/712,463, filed on Oct. 11, 2012.

(51) Int. Cl.
| H02J 3/38 | (2006.01) |
| H02J 4/00 | (2006.01) |
| H02J 1/10 | (2006.01) |
| H02J 7/34 | (2006.01) |
| H02J 7/35 | (2006.01) |

(52) U.S. Cl.
CPC .............. *H02J 3/383* (2013.01); *H02J 1/102* (2013.01); *H02J 4/00* (2013.01); *H02J 3/386* (2013.01);
(Continued)

(58) Field of Classification Search
USPC .............................. 307/64–66, 71–72, 77–78
See application file for complete search history.

(56) References Cited

U.S. PATENT DOCUMENTS 7,456,523 B2   11/2008  Kobayashi
7,939,970 B1*  5/2011  Walling ................ F03D 7/0284
                                                       290/44

(Continued)

FOREIGN PATENT DOCUMENTS

GB    2482486        2/2012
JP    2001352682    12/2001

(Continued)

OTHER PUBLICATIONS

Communication pursuant to Rules 70(2) and 70a(2) EPC for EP Application No. 13845339.4, dated Jun. 23, 2016.

(Continued)

*Primary Examiner* — An Luu
(74) *Attorney, Agent, or Firm* — Brian D. Kaul; Westman, Champlin & Koehler, P.A.

(57) ABSTRACT

A multiple input single output (MISO) hybrid power system includes an electronics system that maximizes output from multiple input sources of different types. In certain embodiments, the electronics system takes in variable power from a plurality of the input sources and outputs a precisely controlled voltage that may simultaneously power a load and charge batteries. The electronics system includes an intelligent controller that monitors input from the power sources and desired output of the system substantially constantly to control maximum power output from each power source. The controller runs through a decision making algorithm to obtain maximum power from the power sources and output a single constant load.

17 Claims, 3 Drawing Sheets

(52) U.S. Cl.
CPC . *H02J 7/34* (2013.01); *H02J 7/35* (2013.01); *H02J 2001/106* (2013.01); *Y02E 10/58* (2013.01); *Y02E 10/766* (2013.01); *Y10T 307/658* (2015.04); *Y10T 307/707* (2015.04)

(56) References Cited

U.S. PATENT DOCUMENTS

| | | | |
|---|---|---|---|
| 8,103,389 B2 | 1/2012 | Golden et al. | |
| 9,141,122 B2 | 9/2015 | Ikawa et al. | |
| 9,465,398 B2 * | 10/2016 | Forbes, Jr. | G06F 1/266 |
| 2010/0181837 A1 | 7/2010 | Seeker et al. | |
| 2012/0175963 A1 | 7/2012 | Adest et al. | |
| 2012/0249081 A1 | 10/2012 | Jui-Tang | |

FOREIGN PATENT DOCUMENTS

| | | |
|---|---|---|
| JP | 2003339118 | 11/2003 |
| JP | 2005269843 | 9/2005 |
| JP | 2012138988 | 7/2012 |
| WO | 2011104882 A1 | 1/2011 |
| WO | 2012043919 A1 | 4/2012 |
| WO | 2012123350 A1 | 9/2012 |
| WO | 2014059236 A1 | 4/2014 |

OTHER PUBLICATIONS

EPO Communication for EP Application No. 13845339.4, dated Jun. 6, 2016.
Communication pursuant to Rules 161(2) and 162 EPC from corresponding European Patent Application No. 13845399.4, dated Jun. 11, 2015.
International Search Report and Written Opinion of PCT/US2013/064477, dated Jan. 30, 2014.
Japanese Office Action from corresponding Japanese Patent Application No. 2015-536916, dated Oct. 17, 2017.
Communication pursuant to Article 94(3) EPC for corresponding EP Application No. 13845339.4, dated Aug. 29, 2017.

* cited by examiner

MULTIPLE INPUT SINGLE OUTPUT HYBRID POWER SYSTEM

CROSS-REFERENCE TO RELATED APPLICATION

This application is a Section 371 National Stage Application of International Application No. PCT/US2013/064477, filed Oct. 11, 2013 and published as WO 2014/059236 A1 on Apr. 17, 2014, in English, and claims the benefit of U.S. Provisional Application Ser. No. 61/712,463, filed Oct. 11, 2012 under 35 U.S.C. § 119(e). Each of the above-referenced applications are hereby incorporated by reference in their entirety.

FIELD

Embodiments of the present invention relate to a multiple input single output (MISO) hybrid power system. More specifically, embodiments of the present invention relate to an electronics system that may be used with a MISO hybrid power system to maximize output from multiple input sources of different types.

SUMMARY

A multiple input single output (MISO) hybrid power system is provided. An electronics system is provided that maximizes output from multiple input sources of different types is provided. In some embodiments, the electronics system may be used with any suitable power source and may be used with a plurality of types of power sources. In some embodiments, the electronics system may be scaled up for use with two or more power sources, including disparate types of power sources, to generate a single output that feeds a single load. In certain embodiments, the electronics system takes in variable power from a plurality of sources and outputs a precisely controlled voltage that may simultaneously power a load and charge one or more batteries.

In certain embodiments, the electronics system may be used to obtain maximum power from the plurality of power sources. The disparate power sources may be, for example, wind turbines, solar cells, power grid, diesel generators, etc. Especially in situations where wind power and solar power are used, the energy input in the system may be highly variable. The electronics system is able to sample the output of the disparate power sources (input to the system), intelligently monitor the input, apply the proper resistance (load) to the input, apply a hierarchy to the multiple energy sources, and obtain maximum power for any given environmental conditions.

The power system may comprise one or more power sources, an electronics system, and batteries. A measurement device may be provided with each power source. In some embodiments, the electronics system comprises one or more power converters and a controller.

In some embodiments, the controller is an intelligent controller. The controller monitors input from the power sources and desired output of the system substantially constantly to control maximum power output from each power source. During operation of the system, the controller runs through a decision making algorithm to obtain maximum power from the plurality of energy sources and output a single, relatively constant load.

In some embodiments, the controller includes three control loops: a system constraints control, a desired input voltage control for each power source, and an input voltage control for each power source. The input voltage control loop controls the input voltage to the system (VIN) to some desired input voltage (VIN-DES). The desired input voltage control loop controls the desired input voltage (VIN-DES) so that the power source produces the maximum power, within the limits of the system constraints. The maximum power is found by searching for the desired input voltage (VIN-DES) that produces the maximum power within some search space defined by the minimum desired input voltage (VIN-DES-MIN) and the maximum desired input voltage (VIN-DES-MAX). The minimum desired input voltage (VIN-DES-MIN) and the maximum desired input voltage (VIN-DES-MAX) may be fixed or dictated by the system constraints control loop. The system constraints control loop controls the system constraints for each power source. The system constraints may include the maximum power that each power source can produce (PMAX), and the maximum output voltage of the system (VOUT-MAX).

BRIEF DESCRIPTION OF THE DRAWINGS

By way of example only, some embodiments of the disclosure will be described with reference to the accompanying drawings, in which.

DETAILED DESCRIPTION OF ILLUSTRATIVE EMBODIMENTS

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices. Such computer readable media and memory for computer programs and software do not include transitory waves or signals.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

It is understood that one or more of the blocks (of the flowcharts and block diagrams) may be implemented by computer program instructions. These program instructions may be provided to a processor circuit, such as a microprocessor, microcontroller or other processor, which executes the instructions to implement the functions specified in the block or blocks through a series of operational steps to be performed by the processor(s) and corresponding hardware components.

Embodiments of the invention are directed to a multiple input single output (MISO) hybrid power system and an electronics system that maximizes output from multiple input sources of different types. The electronics system may be used with any suitable power source and may be used with a plurality of types of power sources. The electronics system may be scaled up for use with two or more power sources, including disparate types of power sources, to generate a single output that feeds a single load. In certain embodiments, the electronics system takes in variable power from a plurality of sources and outputs a precisely controlled voltage that may simultaneously power a load and charge one or more batteries.

In certain embodiments, the electronics system may be used to obtain maximum power from the plurality of power sources. The disparate power sources may be, for example, wind turbines, solar cells, power grid, diesel generators, etc. Especially in situations where wind power and solar power are used, the energy input in the system may be highly variable. The electronics system is able to sample the output of the disparate power sources (input to the system), intelligently monitor the input, apply the proper resistance (load) to the input, apply a hierarchy to the multiple energy sources, and obtain maximum power for any given environmental conditions. Alternatively, in some embodiments, the electronics system may be configured to obtain a power that is less than a maximum power.

Figure 1:
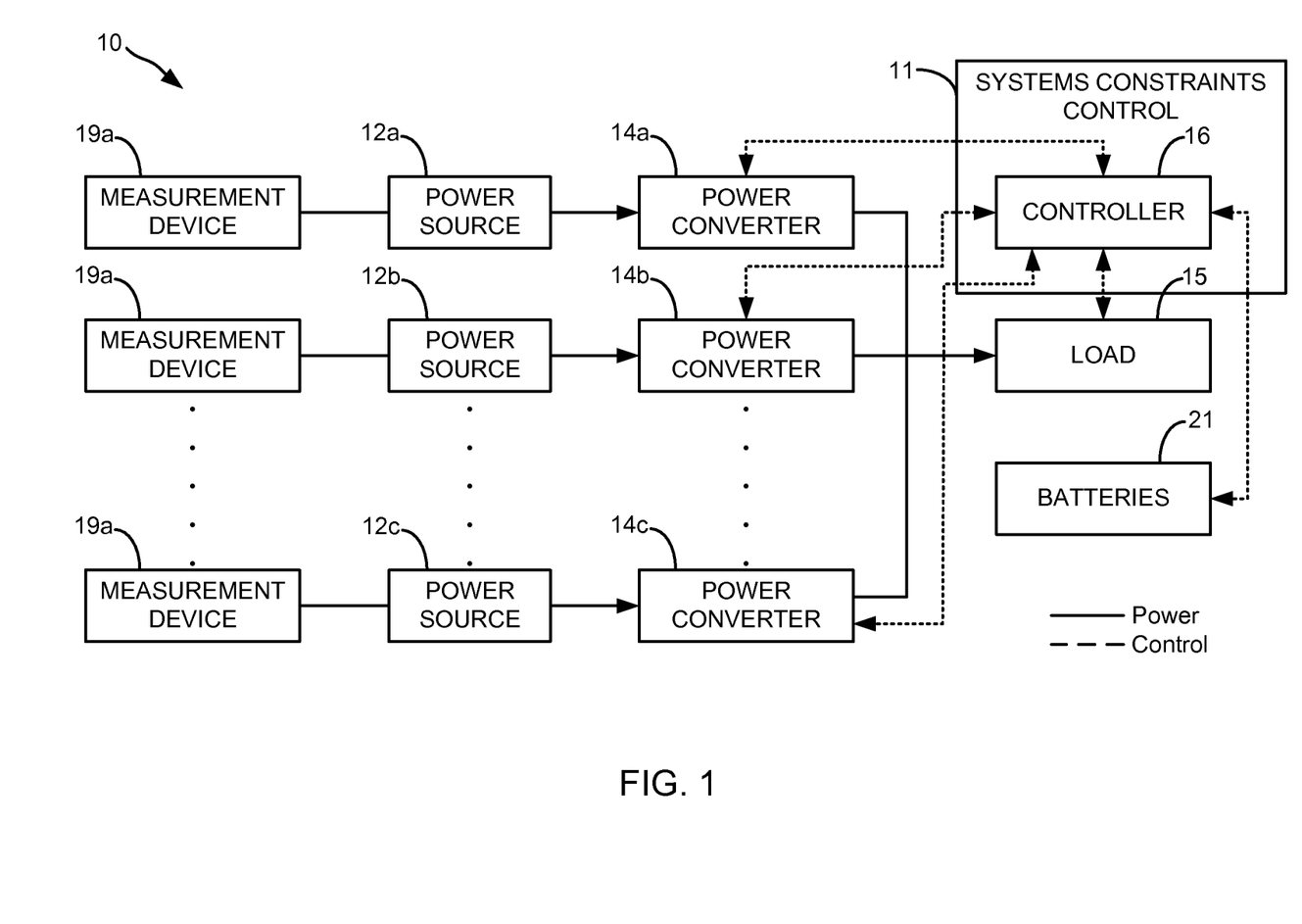
FIG. 1 illustrates a block diagram of a power system in accordance with embodiments of the invention.

FIG. 1 illustrates a block diagram of a power system 10 in accordance with embodiments of the invention. As shown, the power system 10 comprises one or more power sources 12a, 12b, 12c, an electronics system 11, and batteries 18. A measurement device 19 may be provided with each power source 12a, 12b, 12c. The electronics system 11 comprises one or more power converters 14a, 14b, 14c and a controller 16. It is to be appreciated that while three power sources and three power converters are shown, more or fewer power sources and power converters may be used, as indicated by the dotted lines. In most embodiments, the number of power converters will be equal to the number of power sources. The power gathered from the one or more power sources is output in a single, common output that feeds a single load 15 while simultaneously charging one or more batteries 21. The system may be configured to supply only the power demanded by the load if batteries are fully charged.

The electronics system 11 is capable of working with a plurality of disparate power sources 12 (i.e., input sources). That is to say, each of the power sources 12a, 12b, 12c, may be of a different type. For example, the power sources may be solar cells, wind turbines, diesel generators, fuel cells, or any other power source. A challenge with obtaining power from alternative energy sources such as solar and wind is that such alternative energy sources have complex relationships between their operating environment and the maximum power they can produce. The maximum power point from each power source is constantly shifting. Finding and capturing that point, especially with more than one such alternative power source, can be challenging. The electronics system 11 provides a high efficiency at achieving maximum power despite the challenges posed by disparate, environmentally dependent power sources. Further, the electronics system 11 analyzes each power source 12 independently such that additional power sources may be easily integrated into an existing power system 10.

In one embodiment, the power converters 14a, 14b, 14c are substantially identical to one another. By using substantially identical power converters 14 regardless of the type of power source 12, the simplicity of the system 11 is maintained. In one embodiment, each power converter responds approximately the same way to the same inputs. Stated otherwise, the transfer function of each converter is substantially the same even though the power source input may be different. For each substantially identical converter, given some input voltage (VIN), some output impedance (ZOUT), and some control input (M), the output voltage will be approximately the same. In the case of switch-mode power converters, the control input (M) is the duty cycle of the converter (D). The power converters 14 may be any suitable power converter. In most embodiments, the power converters 14 are identical switch-mode power converters, including DC/DC converters.

The controller 16 is an intelligent controller that may comprise one or more processors configured to execute program instructions stored in memory of the controller 16 or memory from another location. As described more fully below, the controller 16 monitors input from the power sources 12 and desired output of the system 10 to control maximum power output from each power source 12. During operation of the system 10, the controller 16 runs through a decision making algorithm to obtain maximum power from the plurality of power sources 12 and output a single, relatively constant load. In one embodiment, the controller 16 adapts over time to continuously improve its performance. More specifically, by monitoring the behavior of the system over time, the controller can narrow the search space of desired input voltage control loop so that the maximum power point is reached more quickly. It also can use the historical power output of each of the power sources in the system to predict the future power output of each of the sources.

Figure 2:
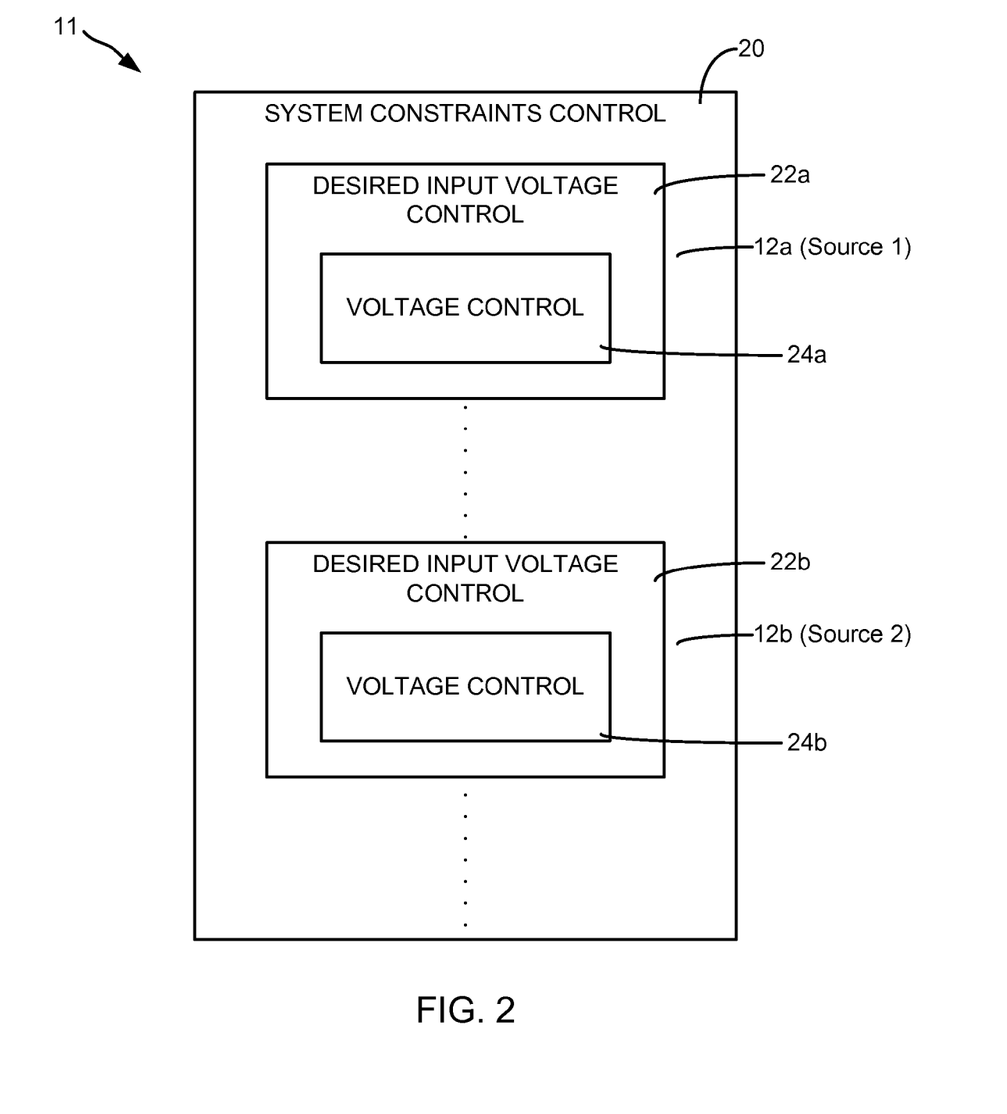
FIG. 2 illustrates a block diagram of a controller for an electronics system in accordance with embodiments of the invention.

FIG. 2 illustrates a block diagram of an exemplary controller 16 for an electronics system in accordance with embodiments of the invention. The controller includes three control loops: a system constraints control loop 20 (the outer loop), a desired input voltage control loop 22a, 22b (the middle loop) for each power source 12a, 12b, and a voltage control loop 24a, 24b (the inner loop) for each power source 12a, 12b. It is to be appreciated that while two power sources are shown, each with an accompanying desired input voltage control and voltage control, more than two power sources may be provided, each having an accompanying desired input voltage control and voltage control.

Figure 3:
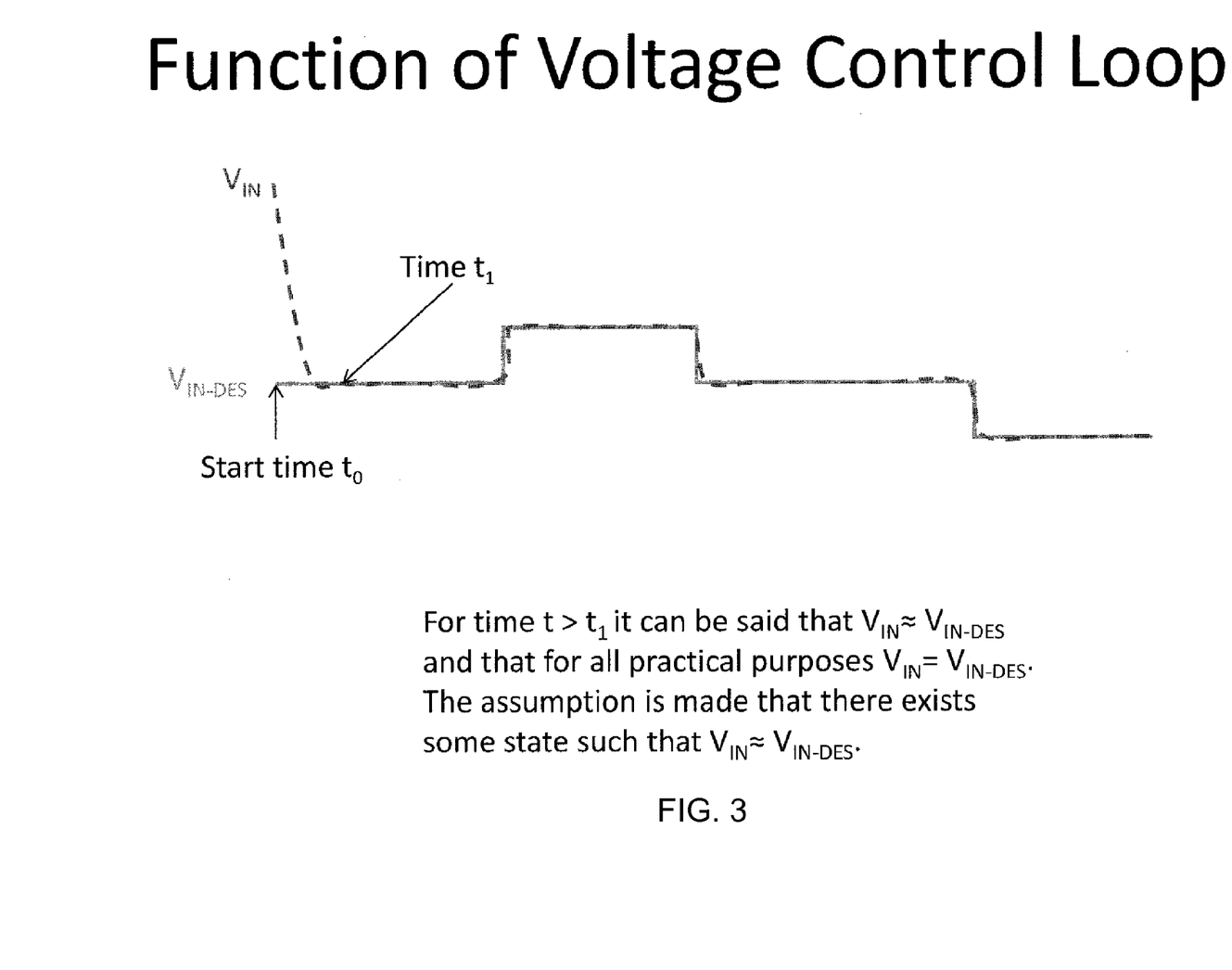
FIG. 3 illustrates the function of input voltage control in accordance with embodiments of the invention.

FIG. 3 illustrates the function of the voltage control loop 24. As shown the voltage control loop 24 controls the input voltage (VIN) so that it is approximately equal to the desired input voltage (VIN-DES). The value of the desired input voltage (VIN-DES) is provided by the desired input voltage control loop 22. The voltage control loop 24 operates by comparing the input voltage (VIN) with the desired input voltage (VIN-DES). If the input voltage (VIN) is greater than the desired input voltage (VIN-DES), the load on the power source in increased. If the input voltage (VIN) is less than the desired input voltage (VIN-DES) the load on the power source is decreased.

Returning to FIG. 2, one embodiment of the controller 16 operates using a Maximum Power Point Tracking (MPPT) algorithm. The MPPT algorithm attempts to extract the maximum available power from each power source 12. The MPPT may be run against any power source, regardless of power source input type. In some embodiments, the controller 16 uses an incremental conductance algorithm to track the maximum power point of each individual power source 12a, 12b.

The measurement device 19 (shown in FIG. 1) associated with each power source 12 measures an input specific variable related to the power available at that power source 12. For example, in the case of wind energy, the measurement device 19 measures wind speed, in the case of solar energy, the measurement device 19 measures brightness, etc.

The value of the input specific variable leads to a narrower window in which to look for the maximum power point. The narrower window provides more precision in the algorithm output as well as faster speed of maximum power point determination. More specifically, the input specific variable may be used in the MPPT algorithm to predict a general window in which the maximum power point is likely to reside.

Returning now to the three control loops 20, 22, and 24 of the controller 16, the three control loops 20, 22, and 24 work together to constantly monitor the output from the power sources (input to the system 10), find the maximum power point for each power source 12, adjust the input to the system to achieve maximum power, and output the maximum desirable power for the system 10 using the appropriate power sources 12 in a hierarchical manner.

The voltage control loop 24 (also referred to as the inner loop) controls output from each power source to give input to each converter. The voltage control loop 24 measures the input voltage (VIN) and learns the desired input voltage (VIN-DES) from the desired input voltage control loop 22. It then modifies the input voltage (VIN) to be substantially equal to the desired input voltage (VIN-DES) by apply the proper resistance (load) to the power source.

Some or all of the MPPT, using the input specific variable from the measurement devices, is done by the middle loop 22. The desired input voltage control loop 22 thus provides the desired input voltage (VIN-DES) to the voltage control loop 24. The desired input voltage (VIN-DES) is restricted to some range typically defined by the minimum desired input voltage (VIN-DES-MIN) and the maximum desired input voltage (VIN-DES-MAX). In some embodiments, this range is defined by the system constraints control loop 20. Generally, the MPPT uses a combination of the input specific variable (a current environmental parameter), past system performance, and prior knowledge of the input power source characteristics to reliably and quickly find the maximum power point.

The systems constraints control loop 20 (also referred to as the outer loop) manages system wide limitations. System wide limitations may include maximum total power (PMAX-TOTAL), and maximum output voltage (VMAX). The system constraints control loop may also manage power source specific limitations such as maximum output power (PMAX), minimum desired input voltage (VIN-DES-MIN), and the maximum desired input voltage (VIN-DES-MAX). These limitations are used to control the power produced by each power source when the total available power exceeds the maximum total power (PMAX-TOTAL).

In controlling energy output, the systems constraints control loop 20 maintains the energy output to within system parameters. Generally, the system provides power to a load. The system may have a maximum output and can set a hierarchy regarding from which power source to take power if the cumulative power from all power sources would exceed the maximum output. The systems constraints control loop 20 acts intelligently to monitor the history of each power source and to change the hierarchy regarding from which power source to take power based on actual performance.

The systems constraints control loop 20 may also use a battery charging algorithm for charging the one or more batteries 18. The systems constraints control loop 20 thus may monitor the battery (including the battery state and the storage level) and load. In some embodiments, the systems constraints control loop 20 may relatively continuously monitor how much battery life remains. This information may be stored for use in an emergency, such as if all grid power is lost, to inform operators about how much battery life is available.

The systems control loop 20 may be configured to control the electronics system 11 such that the system supplies power only the power demanded by the load if batteries are fully charged. Accordingly, the systems control loop 20 may give feedback to the desired input voltage control loop 22 that the batteries are charged and less power is needed such that the desired input voltage control loop 22 increases the desired input voltage (VIN-DES) communicated to the voltage control loop 24. Accordingly, in one embodiment, the power system 10 does not use a dump load and the amount of heat produced by the system 10 is reduced, thereby increasing the robustness of the system 10.

Accordingly, the inner loop 24 controls the input voltage (VIN) to a desired input voltage (VIN-DES). The middle loop 22 controls the desired input voltage (VIN-DES) to within some set range to maximize output power within the system constraints for each input power source. The outer loop 20 controls the system constraints for each input power source to control the output characteristics of the power system.

A default parameter function may be incorporated into the control loops 20, 22, 24 such that if there is a loss of communication between one or more of the control loops, the system 11 will continue running. More specifically, the inner loop 24 defaults to continue operation at the last desired input voltage (VIN-DES) for controlling the input voltage (VIN) to that desired input voltage (VIN-DES) if communication between the inner loop 24 and the middle loop 22 is lost. Similarly, the middle loop 22 defaults to continue operation at the last system constraints if communication between the middle loop 22 and the outer loop 20 is lost.

It will be understood that various modifications may be made to the embodiments disclosed herein. Therefore, the above description should not be construed as limiting, but merely as an example of some embodiments. Those skilled in the art will envision other modifications within the scope and spirit of the claims appended hereto.

What is claimed is:

1. A multiple input single output (MISO) hybrid power system comprising:
   a plurality of power sources;
   one or more measurement devices, each measurement device being associated with at least one of the plurality of power sources and configured to measure an input specific variable relating to the power available at each of the associated power sources, each input specific variable being one of a wind speed and a brightness;
   an electronics system, the electronics system comprising:
      a plurality of power converters, the power converters being operably associated with the plurality of power sources;
      a controller, the controller operably associated with the measurement devices, the controller comprising:
         a constraints control loop for managing system wide limitations to maintain energy output to within system parameters;
         a desired input voltage control loop for determining a desired input voltage; and
         a voltage control loop for controlling an output voltage from each power source that is input to each converter, wherein the voltage control loop learns the desired input voltage from the desired input voltage control loop;
   wherein:
      the controller operates to determine a maximum power point of the MISO hybrid power system using the input s specific variables measured by the one or more measurement devices; and
      the system outputs an energy to a load, wherein the energy output is at a maximum power point from the power sources and within system parameters.

2. The MISO hybrid power system of claim 1, wherein the plurality of power sources comprise a wind power source and a solar power source.

3. The MISO hybrid power system according to any of claims 1-2, wherein one power converter is provided for each of the power sources.

4. The MISO hybrid power system according to claim 1, wherein the plurality of power converters identical.

5. The MISO hybrid power system according to claim 1, wherein the controller uses a Maximum Power Point Tracking algorithm.

6. The MISO hybrid power system of claim 5, wherein the Maximum Power Point Tracking Algorithm is performed by the desired input voltage control loop.

7. The MISO hybrid power system of claim 5, wherein the controller is configured determine the maximum power point based on behavior of the MISO hybrid power system over time.

8. The MISO hybrid power system of claim 1 wherein one measurement device is provided for each of the power sources.

9. The MISO hybrid power system according to claim 8, further comprising a battery, wherein excess energy is fed to the battery to charge the battery.

10. The MISO hybrid power system according to claim 8, wherein the voltage control loop measures the output voltage from each power sources and modifies the output voltage to the desired input voltage of the corresponding converter.

11. The MISO hybrid power system according to claim 10, wherein the constraints control loop sets a hierarchy of the power sources, and, when a cumulative power from all power sources would exceed a maximum output, power sources are selected for delivering power based on the hierarchy of the power sources.

12. The MISO hybrid power system of claim 11, wherein the systems constraints control loop changes the hierarchy of the power sources on actual performance of the power sources.

13. An electronics system for use with a power system, the electronics system comprising:
   one or more converters; and
   one or more measurement devices, each measurement device configured to measure an input variable selected from the group consisting of a wind speed and a brightness; and a controller comprising:
- a constraints control loop for managing system constraints to maintain energy output to within system constraints;
- a desired input voltage control loop for determining a desired input voltage within a set range to maximize output power within the system constraints; and
- a voltage control loop for controlling input voltage to the one or more converter to a desired input voltage;

wherein:
- the controller operates to determine a maximum power point of the hybrid power system using the measured input specific variables; and
- the system outputs a maximum desirable power for the system within system constraints.

14. The electronics system of claim 13, wherein the constraints control loop, the desired input voltage control loop, and the voltage control loop together monitor output from one or more power sources, find a maximum power point for each power source, adjust the input voltage to the power system to the desired input voltage to achieve maximum power, and output the maximum desirable power for the system using the appropriate power sources in a hierarchical manner.

15. The electronics system of claim 14, wherein the controller uses a Maximum Power Point Tracking algorithm.

16. The MISO hybrid power system of claim 15, wherein the Maximum Power Point Tracking Algorithm is performed by the desired input voltage control loop.

17. The MISO hybrid power system of claim 16, wherein the controller is configured for monitoring behavior of the MISO hybrid power system over time to increase efficiency in determining the maximum power point.

* * * * *

UNITED STATES PATENT AND TRADEMARK OFFICE
CERTIFICATE OF CORRECTION

| | |
|---|---|
| PATENT NO. | : 9,979,199 B2 |
| APPLICATION NO. | : 14/435015 |
| DATED | : May 22, 2018 |
| INVENTOR(S) | : Joe Maniaci et al. |

It is certified that error appears in the above-identified patent and that said Letters Patent is hereby corrected as shown below:

In the Claims

Column 8, Line 27, after "converters", insert --are--.

Column 8, Line 57, delete "systems".

Signed and Sealed this
Thirtieth Day of April, 2019

Andrei Iancu
*Director of the United States Patent and Trademark Office*